United States Patent
Miller et al.

(10) Patent No.: US 12,486,114 B2
(45) Date of Patent: Dec. 2, 2025

(54) CONVEYOR BELT MODULE INCLUDING EDGE PROTRUSION

(71) Applicant: Laitram, L.L.C., Harahan, LA (US)

(72) Inventors: Abraham L. Miller, Picayune, MS (US); Richard M. Klein, Slidell, LA (US)

(73) Assignee: Laitram, L.L.C., Harahan, LA (US)

( * ) Notice: Subject to any disclaimer, the term of this patent is extended or adjusted under 35 U.S.C. 154(b) by 205 days.

(21) Appl. No.: 18/280,358

(22) PCT Filed: Mar. 21, 2022

(86) PCT No.: PCT/US2022/021102
§ 371 (c)(1),
(2) Date: Sep. 5, 2023

(87) PCT Pub. No.: WO2022/203999
PCT Pub. Date: Sep. 29, 2022

(65) Prior Publication Data
US 2024/0076130 A1    Mar. 7, 2024

Related U.S. Application Data

(60) Provisional application No. 63/164,654, filed on Mar. 23, 2021.

(51) Int. Cl.
*B65G 17/08* (2006.01)
(52) U.S. Cl.
CPC .... *B65G 17/08* (2013.01); *B65G 2812/02396* (2013.01)

(58) Field of Classification Search
None
See application file for complete search history.

(56) References Cited

U.S. PATENT DOCUMENTS

| | | | | |
|---|---|---|---|---|
| 4,832,187 A | * | 5/1989 | Lapeyre | B65G 17/08 D8/499 |
| 5,738,205 A | * | 4/1998 | Dræbel | B65G 21/2009 198/852 |
| 6,681,922 B2 | * | 1/2004 | Corley | B65G 17/08 198/853 |
| 7,070,043 B1 | * | 7/2006 | MacLachlan | B65G 17/086 198/853 |

(Continued)

FOREIGN PATENT DOCUMENTS

| | | | | |
|---|---|---|---|---|
| WO | 199101261 | | 2/1991 | |
| WO | WO-9101261 A1 | * | 2/1991 | ........... B65G 17/086 |

OTHER PUBLICATIONS

Product Line Extension—Series 1000 Flush Grid—2020 Intralox L.L.C.

*Primary Examiner* — Gene O Crawford
*Assistant Examiner* — Muhammad Awais
(74) *Attorney, Agent, or Firm* — Catherine M. Bishop

(57) ABSTRACT

A conveyor belt module includes a laterally-extending protrusion to prevent misorientation of the module during assembly. In a proper orientation, the laterally-extending protrusion extends into a recess of an adjacent conveyor belt module, with clearance between the protrusion and the nadir of the recess. Reversal of the conveyor belt module prevents the conveyor belt module from fitting into a row of modules.

18 Claims, 3 Drawing Sheets

(56) References Cited

U.S. PATENT DOCUMENTS

| | | | | |
|---|---|---|---|---|
| 7,494,006 B2* | 2/2009 | Knott | ..................... | B65G 17/42 |
| | | | | 198/853 |
| 8,474,602 B2* | 7/2013 | Miller | .................... | B65G 17/24 |
| | | | | 198/779 |
| 8,678,178 B2* | 3/2014 | Bickel, Jr. | .............. | B65G 21/18 |
| | | | | 198/853 |
| 9,475,645 B2* | 10/2016 | Miller | .................... | B65G 23/06 |
| 2008/0023304 A1* | 1/2008 | Elsner | ................ | B65G 17/086 |
| | | | | 198/852 |
| 2013/0140147 A1* | 6/2013 | Lasecki | ................ | B65G 15/32 |
| | | | | 29/525.01 |
| 2014/0367231 A1* | 12/2014 | Gabler | ................ | B65G 15/30 |
| | | | | 198/853 |
| 2016/0176642 A1* | 6/2016 | MacLachlan | .......... | B65G 17/08 |
| | | | | 198/804 |
| 2016/0200520 A1* | 7/2016 | Menke | .................. | B65G 17/40 |
| | | | | 198/853 |

* cited by examiner

CONVEYOR BELT MODULE INCLUDING EDGE PROTRUSION

RELATED APPLICATIONS

The present invention claims priority to U.S. Provisional Patent Application No. 63/164,654, filed Mar. 23, 2021, and entitled "Conveyor Belt Module Including Edge Protrusion", the contents of which are herein incorporated by reference.

BACKGROUND OF THE INVENTION

The invention relates generally to power-driven conveyors and more particularly to modular conveyor belts.

Conveyor belts are widely used in various industries to convey products. Modular conveyor belts are generally constructed of a series of rows of connected belt modules, which can be formed of injection molded plastic, metal or another suitable material. The modules typically extend from a top article-conveying surface to a bottom drive surface through their thickness. Hinge elements along opposite ends of each row interleave with hinge elements of consecutive rows. A hinge rod inserted in the interleaved hinge elements connects the rows together at hinge joints into an endless conveyor belt loop. The conveyor belt is capable of articulating about a drive sprocket or drum at the hinges formed by the interleaved hinge elements between adjacent belt rows. The belt modules composing the belt can be arranged in a bricklay pattern to avoid a continuous longitudinal seam running the length of the belt. Such continuous seams would significantly decrease the beam strength of the belt.

During assembly of a conveyor belt comprising a plurality of hingedly-connected modules, certain modules may be oriented improperly, decreasing the efficiency of the assembly process.

SUMMARY OF THE INVENTION

A conveyor belt module promotes assembly of a conveyor belt by including a laterally-extending protrusion along a side edge of the module. The protrusion extends into a recess formed in an interfacing side edge of an adjacent module when a row including the conveyor belt module is assembled. The protrusion is sized and dimensioned to provide clearance between the protrusion and the recess when the row is properly assembled.

According to one aspect, a conveyor belt module comprises a body extending in height from a top conveying surface to an opposite bottom surface, in length from a first end to a second end and laterally from a first side to a second side, a first set of hinge elements extending from the first end, a second set of hinge elements extending from the second end and a laterally-extending protrusion extending from an edge hinge element in the first set of hinge elements.

According to another aspect, a row of a conveyor belt comprises a first module forming a first side edge of the row and a second module adjacent the first module. The first module includes a first set of hinge elements extending from a first end, the first set of hinge elements including an inner edge hinge element, a second set of hinge elements extending from a second end, and a laterally-extending protrusion extending from the inner edge hinge element. The second module includes a third set of hinge elements aligned with the first set of hinge elements, a fourth set of hinge elements aligned with the second set of hinge elements and a recess in an interfacing edge in the third set of hinge elements. The laterally-extending protrusion extends into the recess without contacting the second module.

According to another aspect, a conveyor belt module forming an interior portion of a conveyor belt row comprises a body extending in height from a top conveying surface to an opposite bottom surface, in length from a first end to a second end and laterally from a first side to a second side, a first set of hinge elements and a second set of hinge elements. The first set of hinge elements extends from the first end of the body and comprises a first edge hinge element, an interior hinge element and a second edge hinge element. The first edge hinge element and second edge hinge element have a width that is about half the width of the interior hinge element. The second set of hinge elements extends from the second end of the body. A first recess is formed in an interfacing side surface of the first edge hinge element. A second recess is formed in an interfacing side surface of the second edge hinge element. A laterally-extending protrusion extends from the second recess past the interfacing side edge of the second edge hinge element.

BRIEF DESCRIPTION OF THE DRAWINGS

These features and aspects of the invention, as well as its advantages, are better understood by referring to the following description, appended claims, and accompanying drawings, in which:

DETAILED DESCRIPTION OF THE INVENTION

A conveyor belt module includes a protrusion extending laterally from a side edge to prevent misorientation of the module during assembly. Embodiments of the invention will be described below relative to certain illustrative embodiments, though the invention is not limited to those embodiments.

Figure 1:
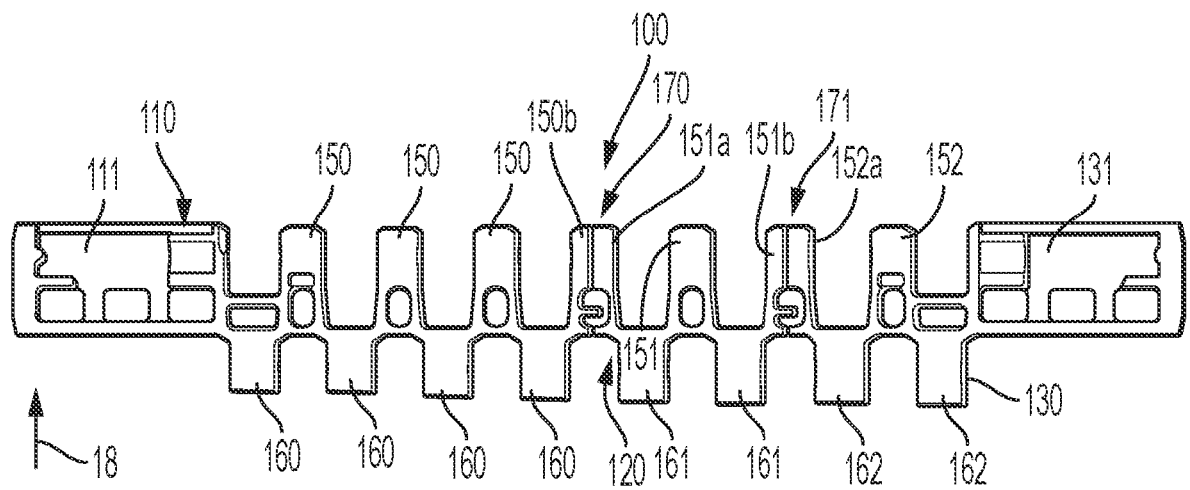
FIG. 1 is a bottom view of a row of a modular conveyor belt comprising conveyor belt modules including laterally-extending edge protrusions according to an embodiment.

FIG. 1 is a bottom view of a row 100 of a modular conveyor belt embodying features of the invention. The illustrative row comprises a first edge module 110, an interior module 120 and a second edge module 130. The row 100 can have multiple interior modules 120, depending on the desired width of the conveyor belt. A modular conveyor belt can be constructed of a series of rows 100 of belt modules arranged side by side in the row, with the modules arranged in a bricklay pattern to offset the seams between side by side modules. Each module 110, 120, 130 extends in a longitudinal direction, that is, in the direction of belt travel 18, from a first leading end to a second trailing end. Leading sets of hinge elements 150, 151, 152 are spaced apart laterally along the leading edges of the modules and trailing sets of hinge elements 160, 162, 162 are spaced apart along the trailing ends of the modules. The leading hinge elements of a trailing row of belt modules are interleaved with the trailing hinge elements of a leading belt row. Hinge openings in the interleaved hinge elements between consecutive rows are aligned to form a lateral passageway extending the width of the belt. A hinge rod, received in the passageway, connects consecutive rows together at a hinge joint at which the belt can articulate as it wraps around a drive or idler sprocket or backbends about shoes or rollers in a return path.

The edge modules 110, 130 include an edge portion 111, 131 that may include a cavity for a plug or other rod retention device to confine the hinge rod within the belt.

The interface 170 between the first edge module 110 and the interior module 120 is formed at split hinge elements on the first, leading end. As shown, each interfacing hinge element 151a, 150b is half the width of the non-interfacing hinge elements 150, 151, 152, so that combined, the interfacing hinge elements 151a, 150b form a complete hinge element. Each lead hinge element 150, 151, 152 includes an opening for drainage, as described below. The interface 171 between the second edge module 130 and the interior module 120 also at split hinge elements 151b, 152a.

Protrusions at the interfaces 170, 171 prevent misorientation of one or more of the modules during assembly, as described below.

Figure 2:
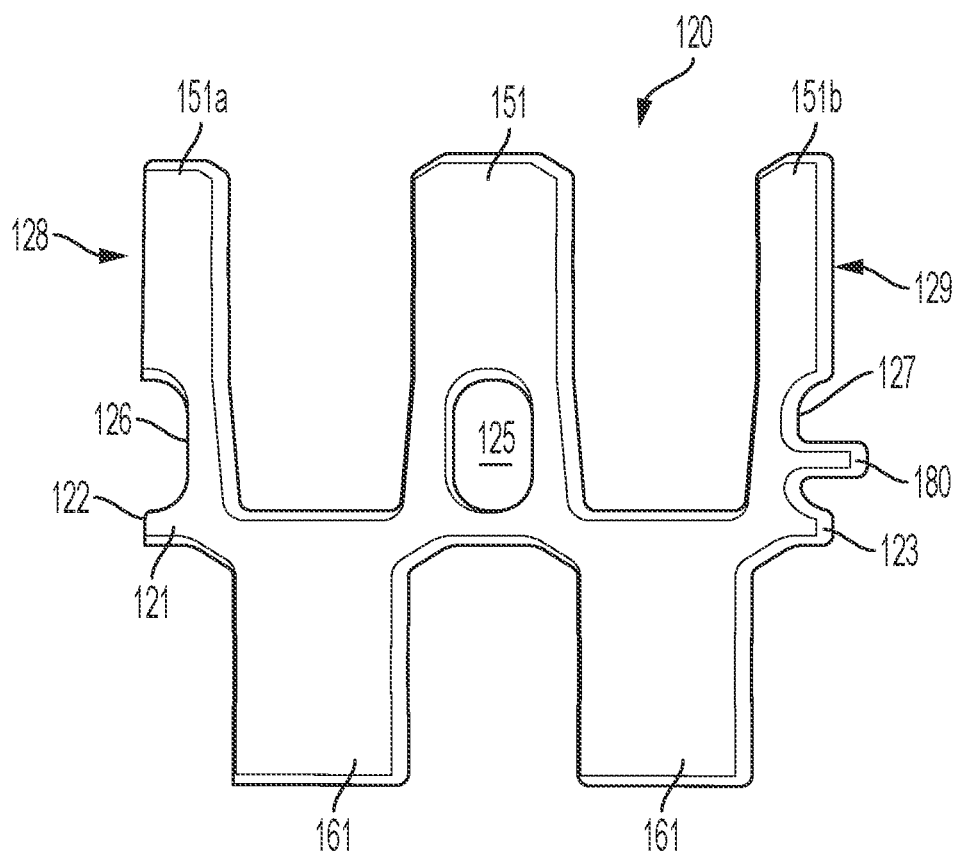
FIG. 2 is a bottom view of an interior conveyor belt module including a laterally-extending edge protrusion according to an embodiment.

Referring to FIG. 2, an interior module 120 comprises a body, shown as a spine 121, extending from a first side edge 122 to a second side edge 123. Leading hinge elements 151, 151a, 151b extend from a first end and trailing hinge elements 161 extend from the second end of the spine 121. The body and hinge elements form a top conveying surface and an opposite bottom surface of the module 120. Interfacing hinge elements 151a and 151b are formed at the first side edge and second side edge and align longitudinally with the intermediate lead hinge element 151. The interfacing hinge elements 151a, 151b are about half the width of the intermediate hinge element 151. Hinge element 151 includes a vertical opening 125 extending from the top conveying surface through the bottom surface for drainage or another purpose. The interfacing hinge elements 151a, 151b include recesses 126, 127 in the interfacing side edges 128, 129. When interfaced with an adjacent module having corresponding recesses, the recesses 126, 127 form a complete opening similar to opening 125.

In addition, the second interfacing hinge element 151b includes a protrusion 180 extending laterally past the interfacing edge 129 and the side edge 123 of the spine 121. The illustrative protrusion 180 extends from the nadir of the recess 127, but the invention is not so limited. The illustrative protrusion 180 has a length that is greater than the depth of the recess 127, but less than twice the depth of the recess 127, as described below.

The second edge module 130 includes a recess in the interfacing edge of the edge hinge element 152a for receiving the protrusion 180, as described below. Alternatively, the interior module 120 is placed adjacent another interior module so that the protrusion 180 extends into the recess 126 of the adjacent interior module.

Figure 3:
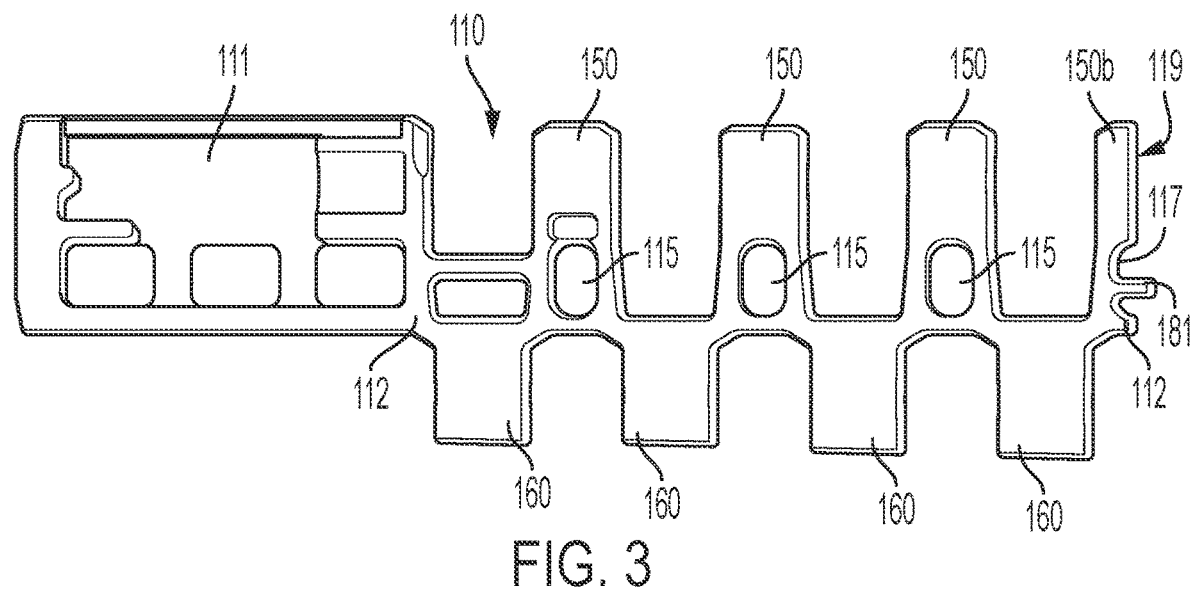
FIG. 3 is a bottom view of an edge conveyor belt module including a laterally-extending edge protrusion according to an embodiment.

Referring to FIG. 3, the illustrative first side edge module 110 comprises an end portion 111 forming a first, outer side edge of the module, a laterally-extending spine 112, first end (lead) hinge elements 150, second end (trailing) hinge elements 160, and an interfacing hinge element 150b at a second, interior side of the module. Openings 115 are formed in the first end hinge elements 150, matching opening 125 in an adjacent module 120.

The interfacing hinge element 150b includes a recess 117 in the interfacing side edge 119 that cooperates a recess 126 of an abutting interior module 120 to form an opening that mimics the openings 115, 125 when a conveyor belt row including the first side edge module 110 and interior module 120 is assembled. The first side edge module 110 further includes a protrusion 181 extending laterally from the nadir of the recess 117 past the side edge of the spine 112 and the interfacing side edge 119 of the interfacing hinge element 150b to facilitate assembly of the conveyor belt.

Figure 4:
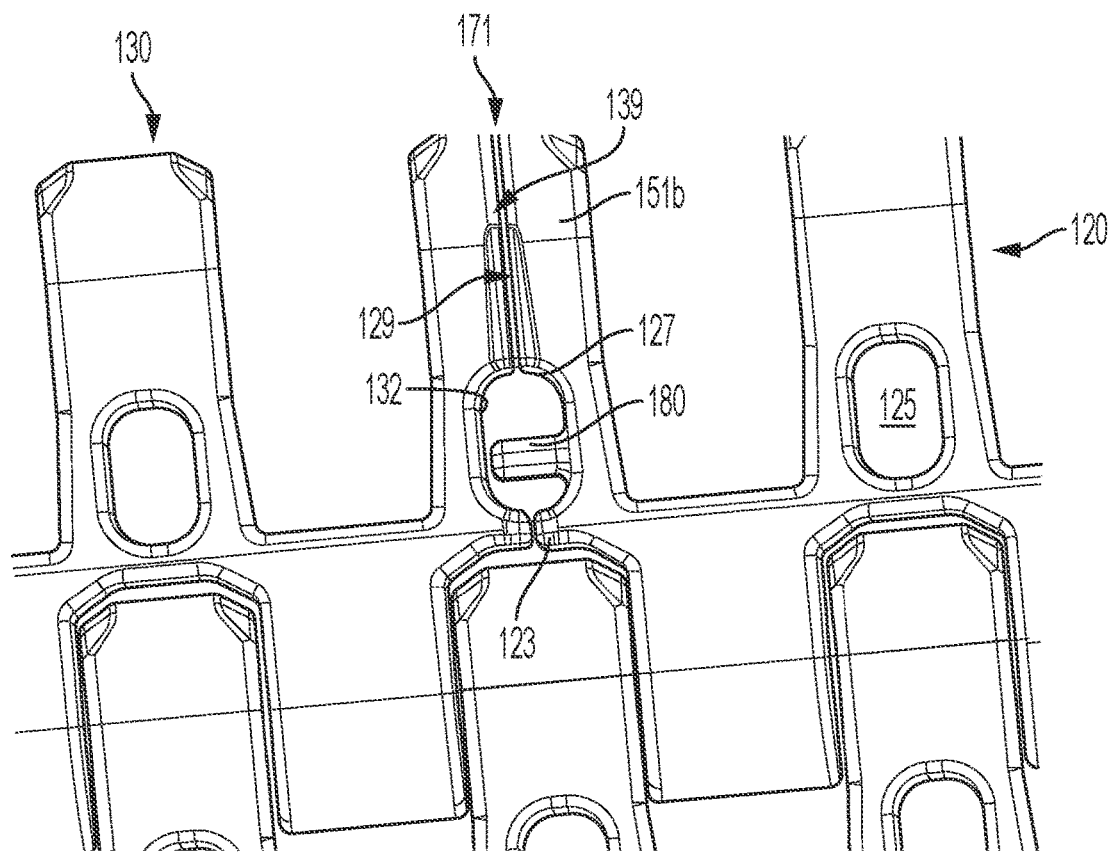
FIG. 4 is a detailed top view of an interface between an interior module including a laterally-extending edge protrusion and an adjacent module in a conveyor belt row having an edge recess for receiving the protrusion.

As shown in FIG. 4, when assembled, the protrusion 180 of the interior module 120 extends past the interface 171, edge 129 and side 123, and into a recess 132 formed in the interfacing edge 139 of the adjacent end module 130. The protrusion 180 is sized and configured to allow a clearance between the protrusion 180 and nadir of the recess 132, so that the protrusion 180 does not contact the adjacent end module 130 and does not interfere with assembly, though alternatively the protrusion 180 may fit into a space formed by the adjacent module and contact the adjacent module.

Similarly, protrusion 181 of the first edge module 110 can extend past interface 170, into recess the 126 of the interior module 120, with clearance between the nadir of the recess 126 and the protrusion 181, as shown in FIG. 1.

In the illustrative embodiment, the protrusion 181 extends from only one side of a module, allowing the module to be efficiently post-machined after manufacture from the opposite side to vary the width of the module, if necessary.

In addition, the protrusion 181 is not limited to extending from a recess.

Figure 5:
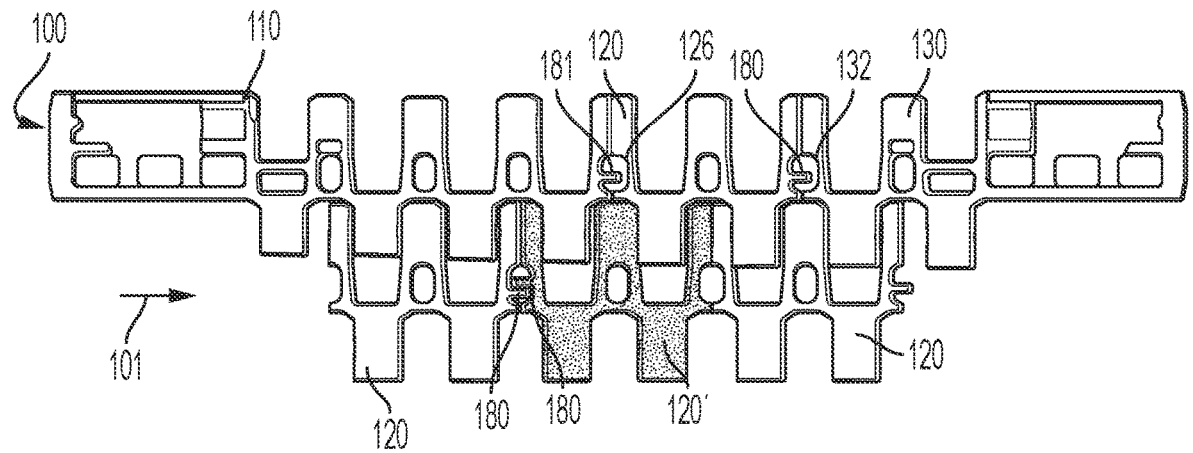
FIG. 5 is a bottom view of two rows of a modular conveyor belt including a module with a laterally-extending edge protrusion in a misoriented position according to an embodiment.
Figure 6:
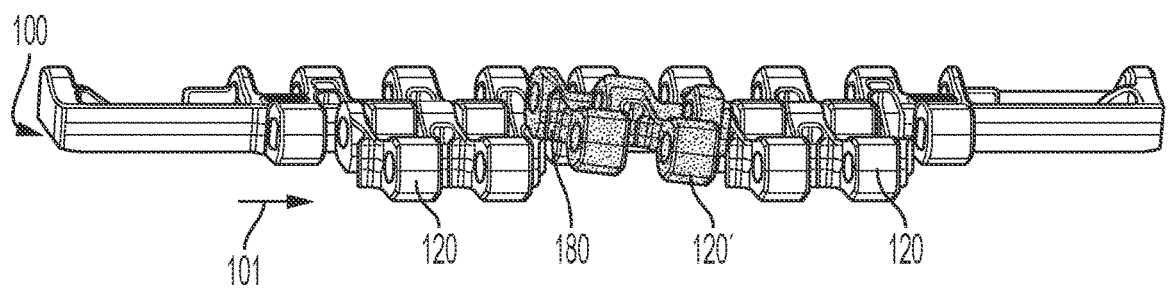
FIG. 6 is an isometric view of the two rows of FIG. 5.

Referring to FIGS. 5 and 6, the protrusions 180, 181 prevent wrong assembly of a module in a conveyor belt. For example, row 100 contains an interior module 120 in proper orientation. In such an orientation, recess 126 in a first side edge of the interior module 120 receives a protrusion 181 extending from the first edge module 110 without interference. A recess 132 of the second side edge module 130 receives a protrusion 180 of the adjacent interior module 120 without interference.

However, if an interior module, such as interior module 120' in row 101, is flipped, it cannot fit between the other modules 120 in the row 101, due to the interference between the protrusions 180. The interference can let an assembler know that the module 120 is upside down. Similarly, if the interior module 120 in the first row 100 were flipped, the interference between protrusions 180, 181 would indicate such.

In addition to preventing wrong assembly of a module, the laterally-extending protrusion 180 or 181 prevents a projection, such as a sprocket tooth, from wedging between modules during operation. In addition, the laterally-extending protrusions may hold the conveyor belt to a minimum width, even if a module is cut too short in width.

Although the invention has been described in detail with reference to a few exemplary versions, other versions are possible. The scope of the claims is not meant to be limited to the versions described in detail.

What is claimed is:
1. A conveyor belt module comprising:
 a body extending in height from a top conveying surface to an opposite bottom surface, in length from a first end to a second end and laterally from a first side to a second side;
 a first set of hinge elements extending from the first end;

a second set of hinge elements extending from the second end;
a first recess in a first interfacing edge of an edge hinge element in the first set of hinge elements; and
a laterally-extending protrusion extending from the nadir of the first recess.

2. The conveyor belt module of claim 1, wherein the laterally-extending protrusion extends past the second side of the body.

3. The conveyor belt module of claim 1, wherein the laterally-extending protrusion has a length that is greater than the depth of the first recess and less than twice the depth of the first recess.

4. The conveyor belt module of claim 1, further comprising a second recess in a second interfacing edge of a second edge hinge element of the first set of hinge elements at the second side of the module, complementary to the first recess.

5. The conveyor belt module of claim 4, wherein the second recess lacks a protrusion so as to receive a laterally-extending protrusion from an adjacent conveyor belt module.

6. The conveyor belt module of claim 1, wherein the edge hinge element has a width that is about half the width of an interior hinge element in the first set of hinge elements.

7. A row of a conveyor belt comprising:
a first module forming a first side edge of the row, the first module including a first set of hinge elements extending from a first end, the first set of hinge elements including an inner edge hinge element, a second set of hinge elements extending from a second end, and a laterally-extending protrusion extending from the inner edge hinge element; and
a second module adjacent the first module, the second module including a third set of hinge elements aligned with the first set of hinge elements, a fourth set of hinge elements aligned with the second set of hinge elements and a recess in an interfacing edge in the third set of hinge elements, wherein the laterally-extending protrusion extends into the recess without contacting the second module.

8. The row of claim 7, wherein the laterally-extending protrusion extends from a recess formed in the inner edge hinge element.

9. The row of claim 7, wherein the second module includes a second laterally-extending protrusion extending from a second interfacing edge in the third set of hinge elements.

10. The row of claim 7, wherein the inner edge hinge element has a width that is about half the width of interior hinge elements in the first set of hinge elements.

11. The row of claim 7, wherein the laterally-extending protrusion has a length a length that is greater than the depth of the recess and less than twice the depth of the recess.

12. The row of claim 7, wherein the second module includes a laterally-extending protrusion extending from a second interfacing edge in the third set of hinge elements.

13. The row of claim 12, further comprising a third module adjacent the second module, the third module including a fifth set of hinge elements aligned with the first and third sets of hinge elements, a sixth set of hinge elements aligned with the second and fourth sets of hinge elements and a recess in an interfacing edge of the fifth set of hinge elements, wherein the laterally-extending protrusion of the second module extends into the recess of the fifth set of hinge elements without contacting the third module.

14. The row of claim 13, wherein the laterally-extending protrusion of the second module has a length about equal to the laterally-extending protrusion of the first module.

15. A conveyor belt module comprising:
a body extending in height from a top conveying surface to an opposite bottom surface, in length from a first end to a second end and laterally from a first side to a second side;
a first set of hinge elements extending from the first end, the first set of hinge elements comprising a first edge hinge element, an interior hinge element and a second edge hinge element, wherein the first edge hinge element and second edge hinge element have a width that is about half the width of the interior hinge element;
a second set of hinge elements extending from the second end;
a first recess formed in an interfacing side surface of the first edge hinge element;
a second recess formed in an interfacing side surface of the second edge hinge element; and
a laterally-extending protrusion extending from the second recess past the interfacing side edge of the second edge hinge element.

16. The conveyor belt module of claim 15, wherein the first and second recess are complementary to each other.

17. The conveyor belt module of claim 15, wherein the laterally-extending protrusion has a length that is greater than the depth of the second recess and less than twice the depth of the second recess.

18. The conveyor belt module of claim 15, wherein the laterally-extending protrusion extends form from the nadir of the second recess.

* * * * *